United States Patent [19]

Maroni

[11] 3,957,597

[45] May 18, 1976

[54] PROCESS FOR RECOVERING TRITIUM FROM MOLTEN LITHIUM METAL

[75] Inventor: Victor A. Maroni, Naperville, Ill.

[73] Assignee: The United States of America as represented by the United States Energy Research and Development Administration, Washington, D.C.

[22] Filed: May 28, 1974

[21] Appl. No.: 473,529

[52] U.S. Cl. .................................. 204/60; 423/648
[51] Int. Cl.² ........................ C25B 1/02; C01B 1/02
[58] Field of Search .............. 204/59 R, 60; 423/648

[56] References Cited
UNITED STATES PATENTS 3,098,020   7/1963   Divian et al. ..................... 204/59 R Primary Examiner—F. C. Edmundson
Attorney, Agent, or Firm—Dean E. Carlson; Arthur A. Churm; Hugh W. Glenn

[57] ABSTRACT

Lithium tritide (LiT) is extracted from molten lithium metal that has been exposed to neutron irradiation for breeding tritium within a thermonuclear or fission reactor. The extraction is performed by intimately contacting the molten lithium metal with a molten lithium salt, for instance, lithium chloride - potassium chloride eutectic to distribute LiT between the salt and metal phases. The extracted tritium is recovered in gaseous form from the molten salt phase by a subsequent electrolytic or oxidation step.

8 Claims, 2 Drawing Figures

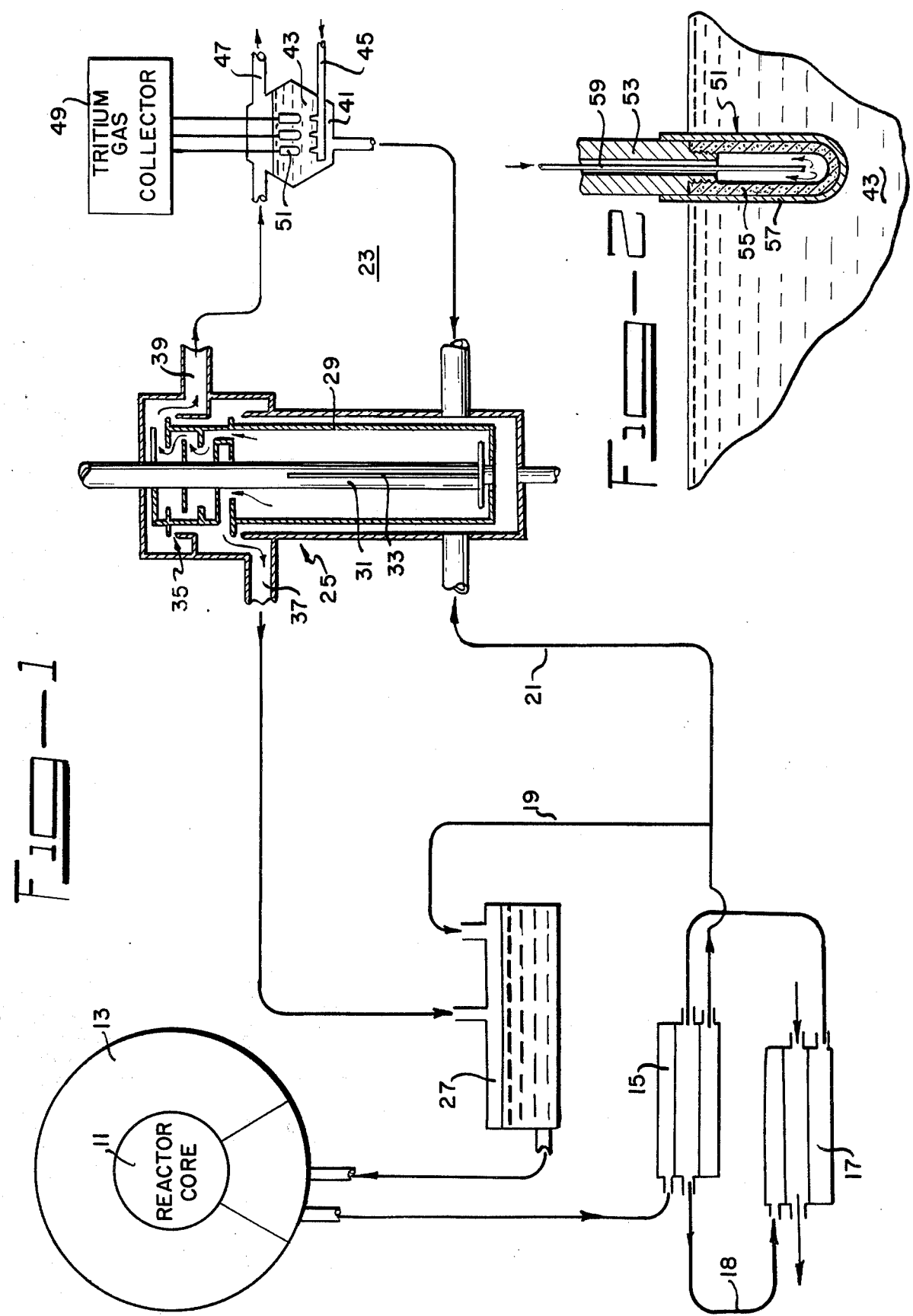

3,957,597

1

PROCESS FOR RECOVERING TRITIUM FROM MOLTEN LITHIUM METAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to a method for recovering lithium tritide and subsequently tritium from molten lithium metal. Although the method has application for the recovery of tritium from a blanket of lithium metal exposed to the neutron flux of a thermonuclear reactor, the method can also be used for the recovery of tritium bred within liquid lithium by more conventional means. For example, lithium metal exposed to the moderated neutron flux of a conventional fission reactor employing U-233, U-235 or Pu-239 will be found to include small concentrations of lithium tritide from the tritium bred by neutron reaction with lithium atoms. In either a thermonuclear or a fission reactor a molten lithium blanket could be part of the heat transfer system used in the production of power or merely a blanket for the breeding of tritium. Tritium recovered with the present process can be used as a fuel in a power plant employing the fusion of deuterium and tritium to produce helium and neutrons with a release of energy as in the reaction $T(D,n)^4He$. Tritium also has application as a radioactive substitute for ordinary hydrogen or protium in biological or other tracer type studies.

Since tritium is unavailable in any significant quantities in nature, a practical and efficient thermonuclear power plant will require the production of tritium for fuel at least at the same rate as it is consumed. A single lithium-6 atom exposed to thermal neutron flux can fission to produce a triton and a helium nucleus. Lithium-7 can be used to offset neutron losses as it will likewise fission on capturing a fast neutron to produce a triton, an $\alpha$ particle and a neutron. However, lithium-7 has a considerably smaller cross section for low-energy neutron flux than lithium-6.

Another method of compensating for neutron losses is to include beryllium-9 within the lithium blanket or in a separate blanket adjacent to the source of neutrons. Beryllium acts to double the neutron flux in accordance with the reaction $^9Be(n,2n)2\,^4He$. Where a double blanket system is used, the high-energy neutrons (14 MeV) produced by the deuterium-tritium fusion will first enter a blanket of beryllium where the above reaction will take place, producing about twice the original neutron flux but at a substantially lower energy. A second blanket of lithium will receive the amplified neutron flux werein lithium-6 and lithium-7 isotopes, each capturing a single neutron, produce helium and tritium.

In operating a D-T fueled thermonuclear power plant, it is desirable that only small amounts of tritium be allowed to build up within the lithium blanket before the recovery rate matches the breeding rate. Otherwise, a substantial tritium inventory is required for the startup of the power plant and substantial tritium reserve is contained during operation. The partial pressure of tritium will likewise increase with concentration, thus increasing the rate of tritium permeation through the blanket and heat exchanger structures. Large quantities of tritium in the blanket system will also increase the radioactivity hazards during routine maintenance and emergencies associated with mechanical and structural failures.

It is expected that the lithium blanket of a typical fusion power plant will require a tritium inventory in excess of $10^6$ curies or about 2,000 gm of LiT, and it is likely that the permissible level for tritium release to the environment for such plants will be limited to about 1,000 curies/year. This corresponds to a daily loss rate of about 3 ppm or less of the total blanket inventory. Based on anticipated standards, tritium releases in excess of the above figure could begin to constitute an objectionable radiologic hazard. Consistent with these standards, a goal of preferably $10^{-10}$ Torr but no more than $10^{-8}$ Torr partial pressure of tritium over the molten lithium is accepted as a design criteria.

Various processes have been evaluated as methods of recovering tritium from the blankets or coolant systems within fusion reactors. (See Watson, "An Evaluation of Methods for Recovering Tritium from he Blankets or Coolant Systems of Fusion Reactors", U.S. AEC report ORNL-TM-3794, December 1972.) Of these processes, gas sparging, distillation, cold traps and evaporation are thought to be unlikely to reduce the tritium concentration in a lithium blanket to acceptable levels (below about 10 parts per million). Another more promising process involves the use of a permeable window with one surface exposed to the lithium blanket and the opposite surface exposed to an oxygen gas for the formation of $T_2O$, but it too includes uncertainties. One possibility for such a permeable window system comprises palladium-coated niobium tubes. However, the ability to make reliable coatings of this nature has not been demonstrated. In addition, it has not been proven how a sufficiently low pressure of tritium can be provided on the metal window surface opposite the lithium blanket to reduce the tritium concentration within the blanket to an acceptable level.

In view of these problems and uncertainties with previously considered processes, the inventor has developed a process for the extraction of lithium tritide into a molten salt. Tritium is thereafter recovered by electrolysis or chemical reaction of the LiT and collection of the evolved tritium gas.

SUMMARY OF THE INVENTION

It is therefore an object of the present invention to provide a process for the recovery of tritium bred within a lithium blanket exposed to neutron flux.

It is also an object to provide a tritium recovery process which maintains lithium tritide at an extremely low concentration within a lithium blanket.

It is a further object to provide such a tritium recovery process which prevents the loss of any significant amounts of tritium to the atmosphere.

In accordance with this invention, tritium bred within a blanket of lithium metal surrounding a thermonuclear reaction or other source of neutrons is recovered as lithium tritide by intimately contacting a flow of lithium metal from the blanket with a molten salt of alkali metal. Two liquid phases are formed with lithium tritide being transferred from the metal to the salt phase. The molten salt and liquid metal phases are separated and the liquid metal depleted in lithium tritide returned to the reactor blanket. Tritium is separated from the molten salt by forming and collecting a hydrogen gas containing tritium isotope such as by a chemical oxidation reaction or by electrolysis. The depleted molten salt is recycled into intimate contact with the flow of liquid-lithium metal from the blanket.

BRIEF DESCRIPTION OF THE DRAWINGS

FIG. 1 is a schematic flow diagram of a tritium recovery process.

FIG. 2 is a fragmentary view of one type of electrode that can be employed in recovering tritium gas within the process of FIG. 1.

DETAILED DESCRIPTION OF THE PREFERRED EMBODIMENT

FIG. 1 illustrates a process for the recovery of tritium bred in the lithium blanket of a thermonuclear reactor. As has been stated above, the tritium could also be bred in lithium exposed to neutron flux within a fission reactor or other suitable neutron source. For ease in understanding, various pumps, valves and other process implements have been omitted, as their use will be readily appreciated by those having ordinary engineering skill.

A blanket or inventory of lithium metal 13 is positioned so as to receive neutrons generated within the core of a thermonuclear reactor illustrated at 11. A flow of hot lithium metal, for example, between 600°-900°C. is withdrawn from the blanket and passed through a primary heat exchanger 15.

The flow of lithium is cooled by about 300 to 500°C. with a secondary coolant 18 circulating through heat exchanger 15 and a secondary heat exchanger or steam generator 17. The steam produced can thereafter be used in process or for electric power generation. The secondary coolant 18 flowing through the two heat exchangers can be a molten metal such as sodium or potassium or mixtures of these metals. A gaseous coolant such as helium, sodium or potassium vapors might also be employed as secondary coolant 18. With a gaseous coolant, steam generator 17 could be replaced with a gas turbine system for the generation of electrical power.

The cooled but still molten lithium metal leaving heat exchanger 15 includes lithium tritide formed from tritium bred within the lithium blanket as a result of neutron bombardment from the fusion reaction. In order to continuously recover lithium tritide from the flow of molten lithium leaving heat exchanger 15, the flow is split into two separate streams 19 and 21. Flow 19 passes to a holding or surge tank 27 for ultimate recycle to the lithium blanket 13. Flow 21 is intimately contacted with a recycling flow of molten salt passing through loop 23.

The molten salt is preferably a lithium salt or a combination of lithium salts which can be easily separated from lithium metal. Particularly suitable salt combinations include eutectic compositions of lithium fluoride and lithium chloride, potassium chloride and lithium chloride and rubidium bromide and lithium bromide. Lithium is less dense than each of these salts by a factor of at least 3 to permit separation by centrifugal or gravitational force. These type separations can be carried out within a mixer separator 25 after the molten lithium metal in stream 21 and the molten salt in loop 23 have been intimately blended within that system.

Various types of liquid-liquid extraction equipment can be employed as the mixer separator indicated at 25. Suitable equipment can include a system of mixer settlers as is described by Knighton et al., "Development of a Mixer-Settler for Liquid Metal-Molten Salt Systems," ANL-7810 (1971); Multi-Stage Countercurrent-Flow Boxes, as illustrated in *Nuclear Engineering Handbook*, McGraw-Hill, New York (1958); or centrifugal contactors as illustrated by Bernstein et al. in *Nuclear Technology*, 20, page 200 (1973) and in "Development and Performance of a High Speed Annular Centrifugal Contactor," ANL-7969 (1973).

The mixer-separator 25 illustrated in the drawing is a centrifugal contactor which offers an attractive approach to the separation due to short residence times and minimal fluid inventory. The contactor is completely described in the corresponding references given above. It comprises a hollow rotor 29 mounted on and driven by a central shaft 31. The shaft includes longitudinal veins 33 for propelling the liquid mixture. A series of weirs 35 illustrated at the top effect separation of the heavier and lighter phases from within the rotor. The lighter lithium metal is withdrawn through port 37 while the heavier phased molten salt is discharged through port 39. In order to accommodate large volumes of liquid lithium, a plurality of contactors can be arranged in parallel with a fraction of the total lithium and salt flows feeding each contactor. If desired, a plurality of centrifugal contactors also can be employed in countercurrent series in order to enhance the extraction of lithium tritide into the molten salt. A countercurrent arrangement can be provided in the ordinary manner with the liquid lithium discharged at port 37 going on to the lower inlet port of a contactor having a lower concentration of lithium tritide while the molten salt discharge in the case of intermediate contactors passes to a contactor having a higher concentration of lithium tritide.

The molten lithium flow leaving contactor 25 through port 37 or from the contactor of lowest lithium tritide concentration within a series of contactors, returns to surge tank 27 where it is blended with flow 19. The combined flow of these two streams then returns to the lithium blanket 13 surrounding the reactor core.

The molten salt enriched in LiT leaving through port 39 of separator 25 flows to a vessel 41 for electrolytic processing. Vessel 41 includes a plurality of electrodes 51 submerged within the molten salt 43 and formed into galvanic cells of 0.5 to 1.5 volts for the electrolysis of lithium tritide into lithium metal and tritium gas. The onset of tritium evolution should occur below 1.5 volts even for very dilute solutions of LiT. This upper voltage level is well below the decomposition voltages of the salt eutectics given herein, all of which have breakdown voltages in excess of 2 volts.

An inlet manifold 45 is illustrated at the bottom of vessel 41 for admitting a sparge gas such as helium or a gas for reacting with LiT, as will be described below. The gas flow is discharged through outlet 47 and can be recycled back through vessel 41 until the concentration of tritium is sufficiently high for recovery of tritium as in tritium gas collector 49.

It is preferable tht the positive electrode at which the tritium gas is collected be designed such that the evolved gas is collected before appreciable back-mixing into the salt phase can occur. For this purpose, a valve-type electrode can be employed. Several valve electrodes have been developed which are suitable for use in the process of the present invention. One such electrode is described by Swinkels in "A Valve Electrode for Use in Fused Salts," *Electrochemical Technol-*

*ogy* 5, 396 (1967). In the present application, a valve electrode of this type is illustrated in FIG. 2. The electrode 51 is shown partially submerged within the molten salt 43 contained within vessel 41. Electrode 51 includes an electrically conductive support tube 53 through which the tritium gas is withdrawn as it is produced. Threaded onto support tube 53 is a tube piece 55, with a closed lower end, that comprises a first layer of the valve electrode. Tube piece 55 is composed of an electrically conductive, porous material that is not wetted by the molten salt. The tube piece can be of porous graphite, porous carbon or a sintered compact of porous metal. e.g., nickel or stainless steel. Embedded and finely dispersed throughout tube piece 55 can be catalyst such as a Raney dispersion of silver, platinum or nickel.

On the external surface of electrode 51 is a second layer or coating 57 of electrically nonconducting material that is of finer porosity than that of the first layer illustrated as tube piece 55. In addition, coating 57 is wetted by the molten salt 43 which it contacts to pass the salt to the electrically conductive layer in tube piece 55. Coating 57 can be of a ceramic material such as $Al_2O_3$, BeO or $CaZrO_3$. It can be mechanically bonded to the electrically conductive layer or preferably flame or plasma-sprayed onto the tube piece 55 as assembled into support tube 53. Tritium gas produced by electrolysis at the interface between layers 55 and 57 is forced through the conductive layer 55 by the capillary pressure of the wetted insulator layer 57.

A carrier gas tube 59 of smaller diameter is supported within the passageways of support tube 53 and tube piece 55. An inert gas such as helium at a slight pressure is bled downwardly through tube 59 and up over the internal surfaces of tube piece 55. Tritium gas emerging from the internal wall of tube piece 55 is entrained within the carrier gas flow and conveyed upwardly through the passageway of support tube 53 to the tritium gas collecting facility 49 shown in FIG. 1. The tritium gas collecting facility 49 will include suitable means for safe compression and storage of the helium-tritium gas mixture. As an alternative, the inert carrier gas can be omitted and a vacuum used to draw the tritium gas production from electrode 51. However, a product discharge under vacuum risks drawing molten salt through the walls of the valve electrode.

Although only a single valve electrode 51 is illustrated as the positive electrode in FIG. 2, it will be understood that a plurality of positive electrodes depending on the processing load in conjunction with sufficient negative electrodes will be employed. Other types and configurations of valve electrodes having conductive and nonconductive layers as well as catalytic and noncatalytic layers might also be employed in the present application. For instance, the Double Skeleton Catalyst Electrode described by Justi and Winsel in "The DSK System of Fuel Cell Electrodes," *Journal of the Electrochemical Society*, 108, 1073 (1961). Also, other than tubular shaped electrodes as illustrated can be employed. For example, elongated plate electrodes having double layers at each surface with an enclosed central chamber could be used to effect the valve electrode function. The plates could be flat or sinuous shaped to increase the surface area exposed to the molten salt.

An alternate, electroprocessing system can include ordinary electrodes of platinum or nickel submerged within the molten salt 43. A sparge gas such as helium from manifold 45 can be bubbled through the salt bath over the electrodes to sweep away tritium gas as it is formed. The mixture of helium and tritium gas can be recycled and collected as the tritium concentration becomes sufficiently high. Even where valve electrodes are used, this gas sparging technique may be beneficial.

One other procedure for recovering tritium from the molten salt is by oxidation of the lithium tritide to form a hydrogen gas containing tritium. One such suitable reaction is as follows:

LiT + DCl yields LiCl + DT

In carrying out this reaction, gaseous DCl is bubbled through the molten salt in a vessel much like that illustrated in 41. Electrodes 51 could be omitted or employed as a supplement in the formation of tritium and deuterium tritide gas.

In order to evaluate various molten salt systems in the extraction of tritium from molten lithium, distribution coefficients for tritium between the two phases were measured in closed capsule experiments. Samples comprising about equal volumes of lithium metal and eutectic salt compositions were sealed in capsules of Nb — 1% Zr having 0.08 cm thick walls. The capsules were heated to 600°C. in the presence of argon carrier gas containing 2 mCi of tritium per standard liter to allow tritium to permeate through the capsule walls into the lithium and molten salt, and equilibrated at temperatures between 400-600°C. After rapid quenching, the capsules were opened and portions of both the lithium and salt phases were analyzed for tritium content by standard dissolution and counting techniques. The tritium levels within the lithium and salt were found to be in the range from 10 to 60 $\mu$Ci/cc. The distribution coefficients for various molten salts are given below in Table I.

Table I

Equilibrium Distribution Coefficients for LiT between Liquid Lithium and Selected Salt Eutectics

| Eutectic Composition | Melting Point of Eutectic (°C.) | Equilibration Temperature (°C.) | Number of Samples | Distribution Coefficient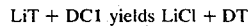 ($D_r$) |
|---|---|---|---|---|
| 31 mole % LiF in LiCl | 501 | 600 ± 50 | 3 | 4.0 ± 1.2 |
| 41 mole % KCl in LiCl | 352 | 550 ± 50 | 2 | 2.2 ± 0.4 |
| 41 mole % RbBr in LiBr | 277 | 500 ± 50 | 1 | 1.2 |

"$D_r$ = Tritium content per unit volume in salt/tritium content per unit volume in lithium metal.

Of the three eutectic salt systems shown above in Table I, the LiCl-KCl system appears as a preferable choice. This is due in part to favorable distribution coefficients and to the relatively low level of radioisotopes formed on neutron activation within the reactor. Since both the salt and metal phases will become mutually saturated within the centrifugal contactor, isotopes from the salt will be exposed to neutron flux within blanket 13 around the reactor. The solubility of LiCl and KCl in lithium is sufficiently low that the concentrations of K and Cl within the lithium metal phase will be no more than about 500 ppm by weight. At these concentration levels, $^{39}K$, $^{35}Cl$, and $^{37}Cl$ will have little or no measurable impact on tritium breeding within the lithium metal blanket. With regard to neutron activation products, only two long-lived radioactive isotopes resulting from $^{35}Cl$, $^{37}Cl$, and $^{39}K$ were discovered. The reactions of the radioisotope decay are as follows:

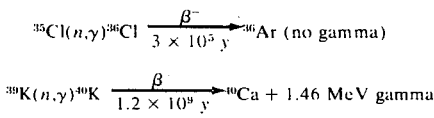

$$^{35}Cl(n,\gamma)^{36}Cl \xrightarrow[3 \times 10^5 \, y]{\beta^-} {}^{36}Ar \text{ (no gamma)}$$

$$^{39}K(n,\gamma)^{40}K \xrightarrow[1.2 \times 10^9 \, y]{\beta^-} {}^{40}Ca + 1.46 \text{ MeV gamma}$$

The $\beta^-$ emission in these reactions is only a negligible fraction of the total $\beta$ emission from the tritium within the lithium blanket. The $\alpha$ decay from $^{40}K$ may be of some concern due to its long half-life but by K levels below 500 ppm in lithium the annual $^{40}K$ production is estimated to be only about 0.03 $\mu$Ci/year/kg of lithium. Such a radiation level will not increase the amount of shielding and precautionary techniques otherwise required in the processing area to protect against radiation from activated materials.

It is estimated that the operation of a fusion reactor power plant employing the deuterium-tritium reaction will require a blanket of natural lithium of about 8 × 10$^8$ grams. An example of a fusion power plant model which would operate at this level is given by R. Krakowski et al., "An Engineering Design Study of a Reference Theta-Pinch Reactor," LA-5336/ANL-8019, Los Alamos Scientific Laboratory and Argonne National Laboratory (1974). In a blanket of natural lithium of this size including 7.4 w/o lithium-6 and the remainder lithium-7, approximately 60 grams per hour of tritium can be bred. From previously determined distribution coefficients such as those given above in Table I, the over-all processing requirements for a centrifugal contactor network can be determined.

One important design criterion for a contactor network is the maximum tritium inventory that can be allowed at steady state within the lithium blanket to minimize the environmental impact of tritium leakage. Partial pressures of tritium not exceeding 10$^{-8}$ Torr and preferably 10$^{-10}$ Torr are desirable for this purpose. Recent thermodynamic studies of the lithium-hydrogen and lithium-deuterium systems by Veleckis et al., "Chemical Physical Inorganic Chemistry Semiannual Report — Jan.-June 1973", Engineering Division, ANL- 8023, pp. 4-11 (1973) have permitted estimates to be made for the pressure-composition dependence of the lithium-tritium system in the dilute solution range. For the lithium blanket under consideration at 500°C. and having 8 × 10$^8$ grams of natural lithium, the steady-state inventory is estimated to be 4250 grams of tritium at a tritium partial pressure of 10$^{-8}$ Torr and 425 grams of tritium for a tritium partial pressure of 10$^{-10}$ Torr. From these values the fraction of total lithium inventory that must be processed per hour, X, is a function of the amount of tritium that must be passed through the contactor network per hour, in order to maintain the permissible steady-state inventory of tritium in the lithium. This relationship is given by the following equation:

$$X = \frac{R_b}{I_{ss}} \left[ \frac{\epsilon \, D_r \, \eta + 1}{\epsilon \, D_r \, \eta} \right]$$

where $X$ = fraction of total lithium inventory processed per unit of time; D hd v is the distribution coefficient in tritium content per unit volume in salt to tritium content per unit volume in metal; $R_b$ is the breeding rate of tritium in unit mass per unit of time; $I_{ss}$ is the steady-state mass of tritium within the lithium inventory; $\eta$ is an efficiency factor which takes into account (i) the volume ratio of lithium to salt in the contactor, (ii) mass transfer impedance in the contactor, and (iii) the efficiency of recovery of tritium from the salt; and $\epsilon$ = the fraction of tritium removed in each pass through the electrolytic recovery system.

Calculated values for various effective distribution coefficients (D hd v$\eta$) are given in Table II. Each centrifugal contactor of the type described was presumed to have operated at 1700 rpm, at which speed such contactors have been proven to process 23,000 liters of fluid per hour while drawing 3.7 kW for continuous operation. The total number of extractor units given in Table II are for equal volumes of salt and lithium metal flowing to each unit in a parallel network of units. The electrical power requirements are based on operation of the contactor units and on the electrolysis of sufficient LiT to produce 60 grams/hr of tritium at 1.5 volts and 20% efficiency.

Table II

| Tritium Partial Pressure (Torr) | Analysis of the Molten-Salt Extraction Scheme | | | |
|---|---|---|---|---|
| | Effective Distribution Coefficient ($D_r\eta$) | Fraction" Processed per Hour (X) | Number of Extractor Units | Required Electrical Power (MW) |
| 10$^{-10}$ | 4.0 | 0.317 | 46 | 0.172 |
| | 2.0 | 0.494 | 72 | 0.267 |
| | 1.0 | 0.847 | 123 | 0.458 |
| | 0.5 | 1.522 | 225 | 0.839 |
| 10$^{-8}$ | 4.0 | 0.032 | 5 | 0.017 |
| | 2.0 | 0.049 | 7 | 0.027 |
| | 1.0 | 0.085 | 12 | 0.046 |
| | 0.5 | 0.155 | 22 | 0.084 |

"Fraction of the total lithium inventory that passes through the contactor network per hour.

From Table II it can be seen that the molten salt extraction of tritium as lithium tritide from a flow or inventory of liquid lithium is a feasible process that might be employed in combination with a thermonuclear power plant. The actual distribution coeficients $D_r$ found and tabulated in Table I are sufficiently high that even with an efficiency factor $\eta$ or 50% or slightly less a reasonable number of contactors or other type extractor units are employed to effect the separation. Even with 225 contactor units in parallel, less than 1 megawatt of electric power will be required and a relatively small amount of plant space would be used for the separation equipment. This level of power consumption constitutes only a small fraction of the power estimated at 12,000 MW(t) and 4,000 MW(e) which could be produced in a fusion power plant using the 60 gms/hr of bred tritium.

It will be seen from the above that the present process provides a method for the breeding and recovery of tritium from within an inventory of lithium metal.

The process permits extremely low concentrations of tritium within the inventory of lithium contained as a blanket around a thermonuclear or conventional reactor and also within the lithium being processed for tritium recovery. These low tritium concentrations will minimize tritium release to the environment and permit early startup without the accumulation of a large tritium reserve within the lithium metal.

The embodiments of the invention in which an exclusive property or privilege is claimed are defined as follows:

1. A process for the separation of tritium from lithium metal including lihium tritide (LiT), said lithium tritide formed from tritium bred in the neutron irradiation of said lithium, said process comprising:
   intimately contacting said lithium metal with a molten salt to distribute lithium tritide between liquid phases of said molten salt and said lithium metal;
   separating said molten salt phase from said liquid lithium metal phase; and
   separating tritium from said molten salt by forming a hydrogen gas including tritium isotope and collecting said gas.

2. The process of claim 1 wherein a fixed inventory of lithium metal is irradiated with neutron flux for the production of LiT, a flow of lithium metal being continuously withdrawn from said inventory and intimately contacted with a continuous flow of said molten salt to distribute LiT between said molten salt and liquid metal phases, and said liquid metal phase depleted in LiT being recycled to said inventory.

3. The improved process of claim 2 wherein said flow of liquid lithium metal as a fraction of the liquid lithium metal inventory is given by the equation:

$$X = \frac{R_b}{I_{ss}} \left( \frac{\epsilon D_v \eta + 1}{\epsilon D_v \eta} \right)$$

$X$ is the fraction of lithium inventory within said flow processed per unit of time;
$R_b$ is the breeding rate of tritium in unit mass per unit of time;
$I_{ss}$ is the steady-state mass of tritium within the lithium inventory; and
$\zeta$ is an efficiency factor which takes into account
   i. volume ratio of Li to salt in the contactor,
   ii. mass transfer impedance in the contactor,
   iii. efficiency of Li recovery from the salt;
$D_v$ is the volumetric distribution coefficient of LiT between the liquid metal and molten salt phases given in mass of LiT/volume of salt per mass of LiT/volume of metal; and
$\epsilon$ = the fraction of tritium separated from said molten salt by forming hydrogen gas including tritium isotopes.

4. The process of claim 2 wherein said flow of lithium metal contains a concentration of tritium below $10^{-5}$ mass fraction.

5. The process of claim 2 wherein said flow of molten salt is about equal to said flow of lithium metal by volume.

6. The process of claim 1 wherein said hydrogen gas containing tritium isotope is formed by electrolysis of LiT at 0.5 to 1.5 volt.

7. The process of claim 1 wherein said hydrogen gas containing tritium isotope is formed by oxidizing said tritium in LiT with DCl to form DT gas.

8. The process of claim 1 wherein said molten salt is selected from the goup consisting of eutectic compositons of LiCl-KCl, LiF-LiCl and RbBr-LiBr.

* * * * *